Jan. 4, 1938. E. NIELSEN 2,104,268
FOOD MIXER
Filed April 5, 1937 2 Sheets-Sheet 1
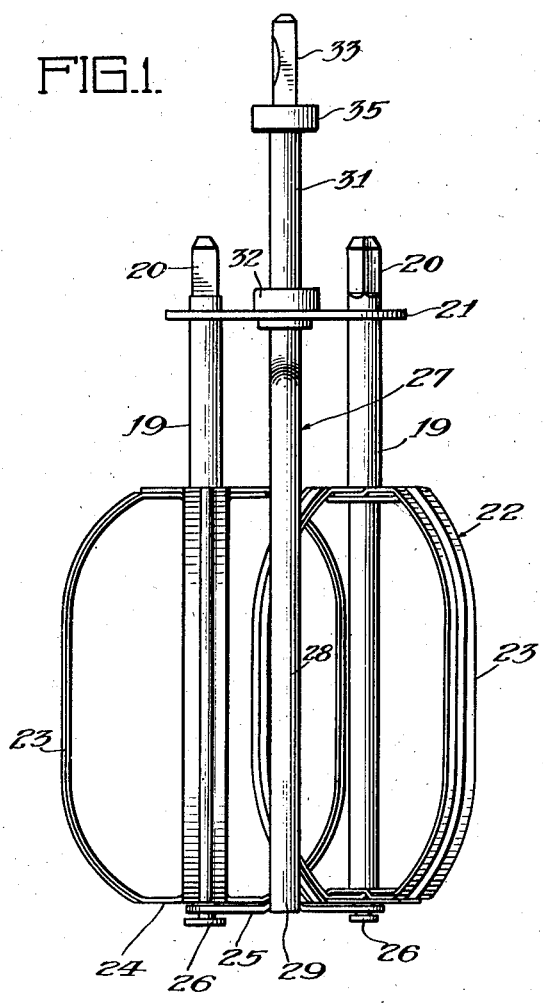
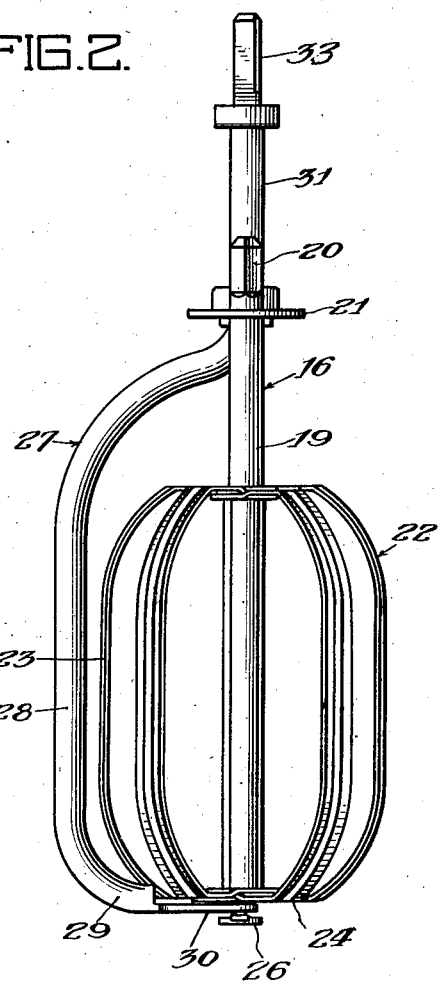
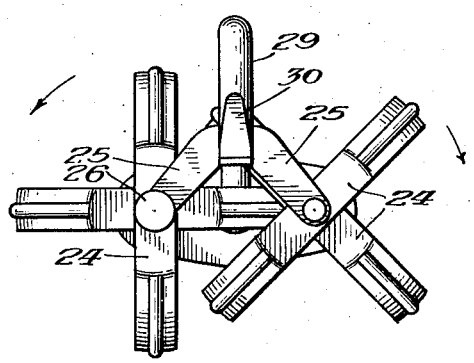
Inventor:
Emanuel Nielsen.
By Bertha L. MacGregor
Attorneys Jan. 4, 1938. E. NIELSEN 2,104,268
FOOD MIXER
Filed April 5, 1937 2 Sheets-Sheet 2

Inventor:
Emanuel Nielsen,
By Bertha L. MacGregor
Attorneys

Patented Jan. 4, 1938

2,104,268

UNITED STATES PATENT OFFICE 2,104,268

FOOD MIXER

Emanuel Nielsen, Racine, Wis., assignor to Scovill Manufacturing Company, Waterbury, Conn., a corporation of Connecticut Application April 5, 1937, Serial No. 135,021

2 Claims. (Cl. 259—131)

This invention relates to motor driven food mixers and more particularly to an improved agitator assembly for food mixers.

One of the objects of the invention is to provide a guard for the rotatable beaters, which will minimize the likelihood of unintended contact between the revolving beaters and a spoon or other kitchen tool.

Another object is to provide a guard and rotatable beaters so arranged relatively to the power unit and support that any object, such as a spoon or spatula, which may come into contact with the beaters, will be thrown outwardly and away from the beaters and be prevented from passing between the interdigitating members of the beaters, where such contact would result in injury to the mixer.

Another object is to provide a guard efficient for its intended purpose, which will not detract from the efficiency of the beaters by interfering with the accessibility, to the beaters, of the ingredients being mixed.

Another object is to produce a guard, the contour of which is so correlated to the form of the beaters that it facilitates the mixing of stiffer batters or mixtures than could be attained heretofore.

Another object is to provide an agitator capable of mixing or whipping small quantities of materials occupying a shallow space in the bottom of a mixing bowl.

In the preferred embodiment, the guard also serves as part of the frame whereby a pair of beaters are held in assembled relation, to be attached to and detached from the machine as a unit, but the invention may be applied to a mixer provided with separate beaters.

In the drawings:

Fig. 1 is a front elevation of an agitator assembly embodying my invention.

Fig. 2 is a side elevation of the same.

Fig. 3 is a bottom view of the agitator as shown in Fig. 1.

Figure 4:
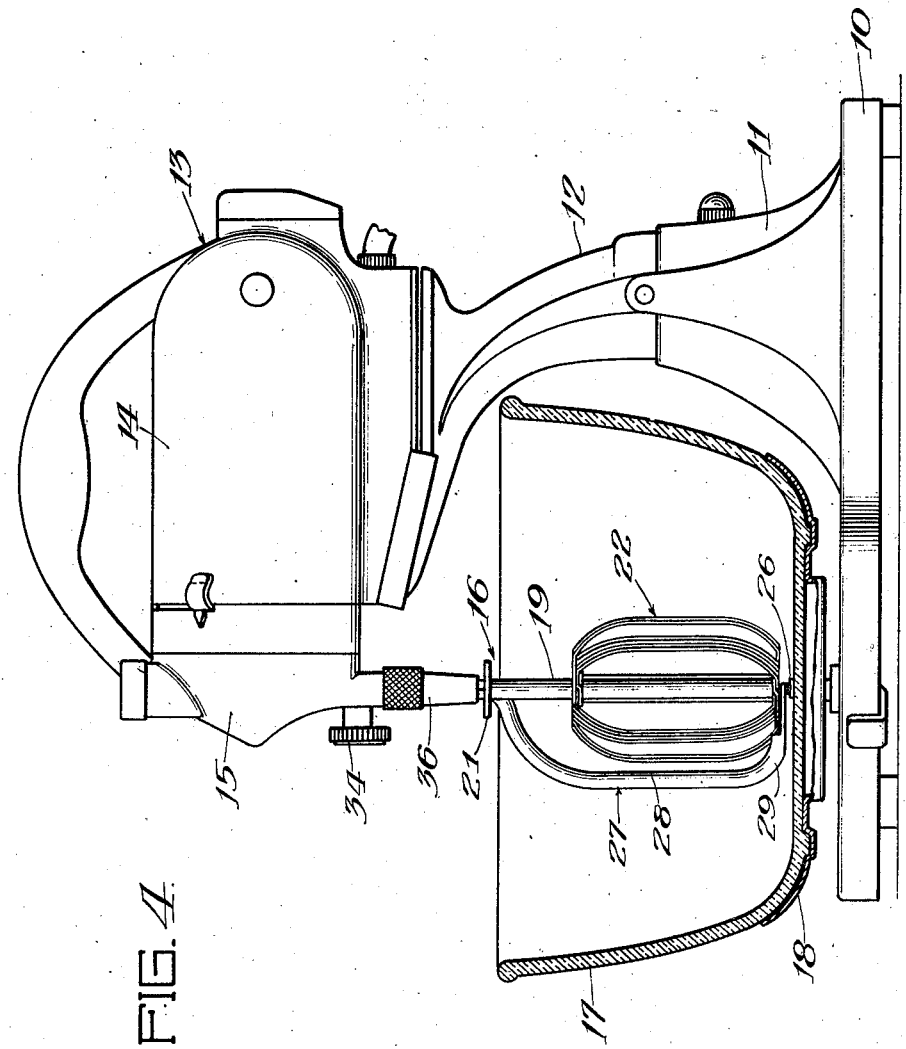
Fig. 4 is a side elevation of a motor driven food mixer embodying the invention, the mixing bowl being shown in section.

In that embodiment of the invention which I have chosen to illustrate in the drawings, a horizontally disposed base is indicated at 10, an upright socket, integral with the base, at 11, a pivotally mounted arm at 12, and a motor driven food mixer 13 detachably mounted on said arm 12. The food mixer comprises a motor 14, carrying a gear casing 15, and a detachable agitator or beater unit 16. A mixing bowl 17 rests on a rotatable plate 18 on the base 10.

The agitator unit 16 comprises a pair of vertical beater shafts 19, 19, provided with squared ends 20, 20. The shafts 19 extend loosely and rotatably through a plate 21 and each has fixedly secured to it a pair of beater rings 22 elongated vertically so as to provide relatively long, flat side members 23. The rings 22 are also flattened at their bottoms 24, providing maximum efficiency when the beaters operate in materials occupying a shallow space in the bowl. The lower ends of said shafts are connected in spaced apart position by a flat L-shaped member 25 consisting of two arms at right angles to each other, each arm having a pin 26 extending rotatably through its free end and connecting the lower ends of the shafts 19 to said arms. Thus the shafts 19 are held in their intended relative positions while free to rotate about their respective axes.

A rod 27 serves as a guard for the beaters and, in this embodiment, is part of the means for attaching the beater assembly to the power unit of the mixer. The rod 27, in the major part of its lower portion, is substantially parallel with the rings 22, particularly in the part indicated at 28. The lower end 29 is curved, following the contour of the rings 22, and is cut away to provide a flat end 30 which is rigidly connected to the member 25 at the junction of the arms. Above the perpendicular portion 28, the rod 27 is curved toward the vertical plane of the shafts 19 and then extends perpendicularly upwardly as indicated at 31. The part 31 of the rod 27 extends through the plate 21 and is rigidly secured to it at 32. The upper end portion 33 fits into the gear casing 15 and is retained therein by a plunger or hand screw 34.

Preferably a shoulder 35 is provided on the part 31 of the guard rod 27 to guide the operator in attaching the upper end 33 to the gear casing. The square ends 20 of the beater shafts 19 are rotatably engaged by the sockets 36 of the gear casing, the guard 27 being non-rotatable.

As shown in Fig. 4, when the beater assembly is attached to the power unit of the mixer, the beater shafts are in alinement transversely of the base 10 and the guard 27 is located forwardly of the beaters, that is, the beaters are between the guard 27 and the rearward upright support 12. The beater shafts rotate in opposite directions, as shown by the arrows in Fig. 3. The rings 22 of the respective beater shafts 19, as viewed from the front end of the mixer, revolve away from each other and from the guard until the revolution has progressed beyond the transverse alinement of the shafts, whereupon the rings revolve toward each other and toward the guard from the rear to the initial position.

The operator is most likely to face the front end of the mixer and if she should inadvertently place a spoon or spatula into contact with the beaters, it would be thrown outwardly and away from the rings 22.

The provision of a single guard rod at the front of the agitator assembly results in maximum accessibility, to the beaters, of the ingredients to be mixed, and the parallel relationship of the guard rod and beater rings facilitates mixing of stiff batters which would automatically move out of contact with the rings if the guard and rings were not substantially parallel.

Changes may be made in details of construction without departing from the scope of my invention and I do not intend to be limited to the exact form shown and described, except as set forth in the appended claims.

I claim:—

1. An agitator assembly for a food mixer, comprising a pair of rotatable beater shafts, beater elements on said shafts, a cross piece connecting the shafts in spaced relation adjacent their upper ends, a guard member comprising a relatively rigid rod connected to said cross piece and having an intermediate portion of its length bowed outwardly to extend substantially parallel with the sides of the beater elements, and the lower end of said guard rod being turned inwardly in substantially the plane of the lower ends of said beater elements and having a flattened forked end portion connecting the lower ends of said shafts in spaced relation, whereby to provide maximum efficiency when said beater elements must operate in materials occupying a shallow space therearound.

2. A food mixer comprising a base, a power unit, a support for the power unit rising from the base, and an agitator depending from the power unit and detachably connected thereto, said agitator comprising a pair of rotatable beater shafts, beater elements on said shafts, an upper cross piece in which said shafts are rotatably mounted in positions spaced apart laterally of the base, and a single guard member comprising a relatively rigid rod connected to said cross piece and having the lower portion of its length laterally offset to extend substantially parallel with the sides of the beater elements and its lower end turned inwardly in substantially the plane of the lower ends of the beater elements said lower end portion being cut away on its upper side to provide a flat end portion from which angularly spaced flat arm portions connect the lower ends of said shafts in uniform spaced relation.

EMANUEL NIELSEN.